(No Model.)  9 Sheets—Sheet 1.

G. B. MASSEY, Dec'd.
S. R. Massey & S. A. Bryant, Administrators.
TICKET PRINTING MACHINE.

No. 445,651. Patented Feb. 3, 1891.

Fig. 1.

WITNESSES:
W. R. Davis.
Wm. W. Luyster.

INVENTOR:
G. B. Massey
BY Munn & Co.
ATTORNEYS.

THE NORRIS PETERS CO., PHOTO-LITHO., WASHINGTON, D. C.

(No Model.)
9 Sheets—Sheet 4.

G. B. MASSEY, Dec'd.
S. R. Massey & S. A. Bryant, Administrators.
TICKET PRINTING MACHINE.

No. 445,651.
Patented Feb. 3, 1891.

Fig. 4.

WITNESSES:
N. R. Davis.
Wm W. Duyster

INVENTOR:
G. B. Massey
BY Munn &Co
ATTORNEYS.

(No Model.) 9 Sheets—Sheet 5.

G. B. MASSEY, Dec'd.
S. R. MASSEY & S. A. BRYANT, Administrators.
TICKET PRINTING MACHINE.

No. 445,651. Patented Feb. 3, 1891.

WITNESSES:
INVENTOR
G. B. Massey
BY
Munn & Co.
ATTORNEYS.

(No Model.) 9 Sheets—Sheet 6.

G. B. MASSEY, Dec'd.
S. R. MASSEY & S. A. BRYANT, Administrators.
TICKET PRINTING MACHINE.

No. 445,651. Patented Feb. 3, 1891.

Fig. 6.

WITNESSES:
N. R. Davis.
Wm W. Cuyster

INVENTOR:
G. B. Massey
BY Munn & Co.
ATTORNEYS.

(No Model.)   G. B. MASSEY, Dec'd.   9 Sheets—Sheet 7.
S. R. Massey & S. A. Bryant, Administrators.
TICKET PRINTING MACHINE.

No. 445,651.   Patented Feb. 3, 1891.

(No Model.) 9 Sheets—Sheet 8.

G. B. MASSEY, Dec'd.
S. R. Massey & S. A. Bryant, Administrators.
TICKET PRINTING MACHINE.

No. 445,651. Patented Feb. 3, 1891.

WITNESSES:
Donn Twitchell
Wm W. Ouyster

INVENTOR:
G. B. Massey
BY
Munn & Co
ATTORNEYS.

(No Model.)

G. B. MASSEY, Dec'd.
S. R. MASSEY & S. A. BRYANT, Administrators.
TICKET PRINTING MACHINE.

No. 445,651.

Patented Feb. 3, 1891.

WITNESSES:
E. M. Clark
Wm W. Duyster

INVENTOR:
G. B. Massey
BY Munn & Co
ATTORNEYS.

UNITED STATES PATENT OFFICE.

GIDEON B. MASSEY, OF MAMARONECK, NEW YORK; SARAH R. MASSEY AND STANLEY A. BRYANT ADMINISTRATORS OF SAID GIDEON B. MASSEY, DECEASED.

TICKET-PRINTING MACHINE.

SPECIFICATION forming part of Letters Patent No. 445,651, dated February 3, 1891.

Application filed October 19, 1889. Serial No. 327,576. (No model.)

*To all whom it may concern:*

Be it known that I, GIDEON B. MASSEY, of Mamaroneck, in the county of Westchester and State of New York, have invented a new and Improved Ticket-Printing Machine, of which the following is a full, clear, and exact description.

This invention relates to ticket-printing machines; the object of the invention being to provide a machine which will print a ticket from a given station to any station whatsoever, and at the same time date and consecutively number all tickets issued.

A further object of the invention is to provide for the preservation of a record of all tickets printed.

To the ends named the invention consists of certain novel constructions, arrangements, and combinations of elements, which will be hereinafter more fully explained, and specifically pointed out in the claims.

Reference is to be had to the accompanying drawings, forming a part of this specification, in which similar letters and figures of reference indicate corresponding parts in all the views.

Figure 5:
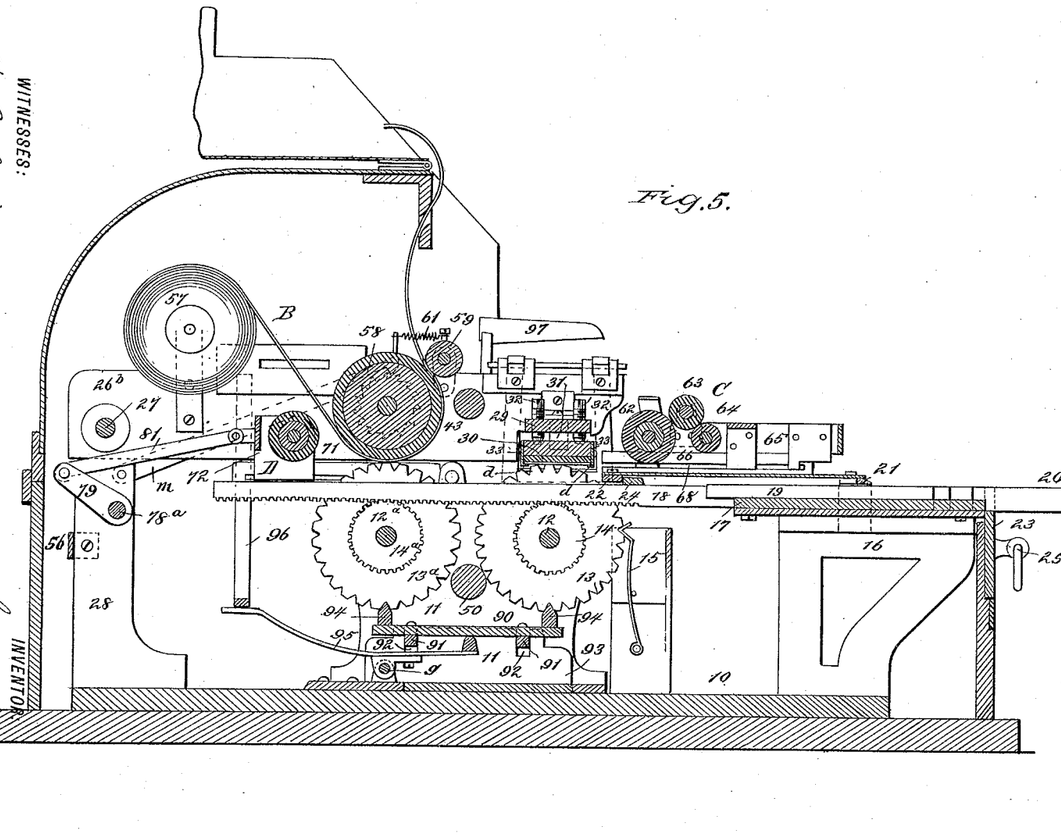
Fig. 5 is a longitudinal sectional view of the same side of the machine, the parts being represented in their printing position.
Figure 7:
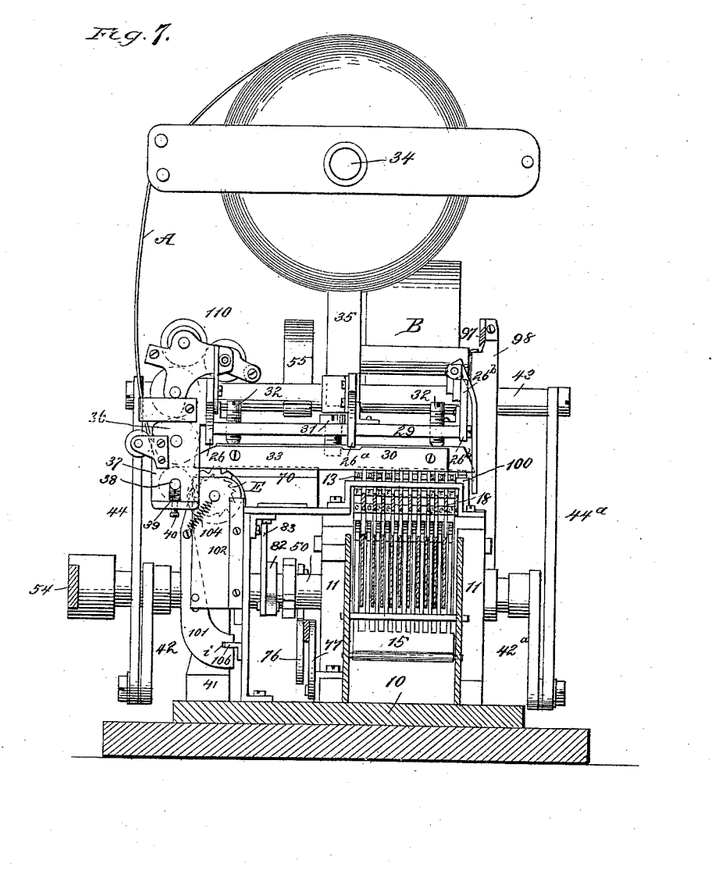
Fig. 7 is a cross-sectional elevation on the line 7 7 of Fig. 3.
Figure 8:
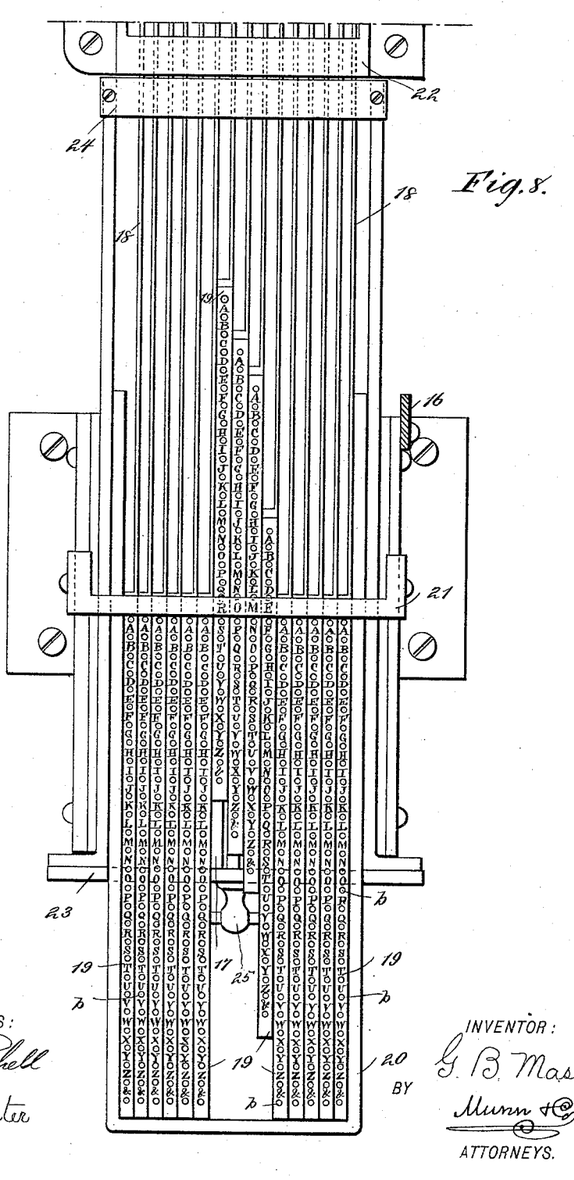
Fig. 8 is an enlarged view of the alphabetical slides.
Figure 9:
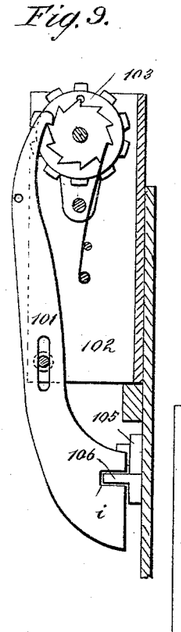
Fig. 9 is an enlarged detail view of a portion of the numbering attachment.

In the drawings, 10 represents the base-plate of the machine, to which base-plate there are secured two upwardly-extending bifurcated standards 11. The forward arms of the standards 11 carry a shaft 12, upon which shaft there is loosely mounted a series of alphabetical disks 13, each of the said disks being made integral with or rigidly connected to a gear 14. The peripheral faces of the disks 13 are notched, and upon the faces of the projections between the notches the letters of the alphabet and such other characters as may be desired are engraved. To secure an approximate register of the disks 13, I provide springs 15, that are arranged as best shown in Figs. 5 and 7. The rear arms of the standards 11 carry a shaft $12^a$, which supports a second series of alphabetical disks $13^a$, such disks being provided or made integral with gears $14^a$, the disks 13 and $13^a$ being duplicates.

Figure 6:
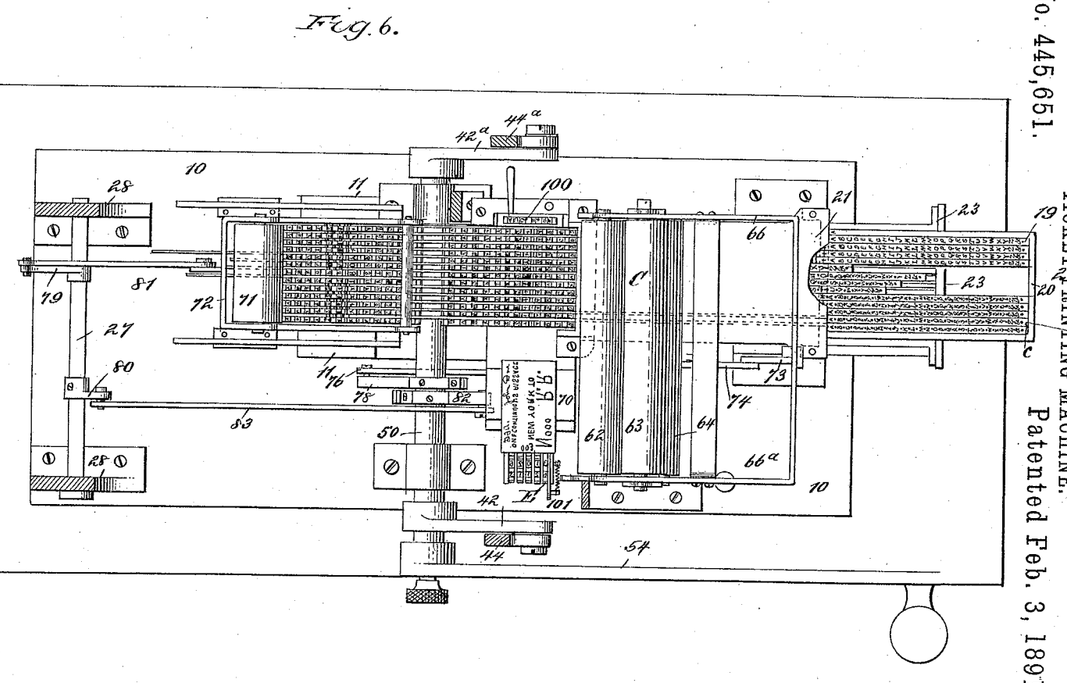
Fig. 6 is a sectional plan view on the line 6 6 of Fig. 2.

In advance of the standards 11 I mount a frame 16, which supports a series of longitudinal horizontal strips 17, and between these strips 17 I mount racks 18, such racks engaging the gears 14 and $14^a$. The outer ends of the racks 18, which rest between the strips 17, are untoothed, and to the side faces of the said racks I connect strips 19, upon the upper faces of which strips there appear letters and characters which correspond with the letters and characters formed upon the disks 13 and $13^a$. In connection with each letter or character appearing upon the strips 19 I provide an aperture $b$. The strips 19 project slightly above the upper surface of the racks 18, forming shoulders at the inner ends of the said strips. These strips 19 are held within a movable frame 20, and such frame is in turn held, as are also the strips 19, by a strap 21, which is secured to the frame 16, and a strap 22, that is secured to the standards 11. The forward edge of the strap 21 serves as a gage, the arrangement being such that by placing a pointer or other suitable implement in the aperture corresponding with any given letter appearing upon any particular strip and moving such strip inward until the pointer rests against the edge of the strip 21 the disks 13 and 13$^a$ will be moved until their letters corresponding with the strip-letters are brought into printing position. In order that the strips may be returned to the position in which they are shown at $c$ in Fig. 6, I provide a slide 23, which carries a cross-bar 24, such cross-bar fitting close down upon the upper edges of the racks 18, the arrangement being such that when the slide is drawn forward the cross-bar will strike against the rear edges of the strips 19 and the racks which have been moved inward will be drawn out to their normal position. This slide 23 is provided with a knob or ring 25.

The platen-frame of the machine is made up of longitudinal strips 26, 26$^a$, and 26$^b$, such strips being pivotally mounted upon a transverse shaft 27, that is supported by standards 28, the standards being bolted to the rear upper face of the base-plate 10. The forward ends of the platen-frame strips support a cross-bar 29, and to this cross-bar the platen 30 is held by a central set-screw 31, a proper adjustment of the platen being secured by means of adjusting-screws 32, four of such screws being employed, and the screws being arranged above each corner of the platen, as will be readily understood. To each side of the platen proper I secure plates 33, that are formed with inwardly-extending flanges $d$, which rest in a plane slightly below that occupied by the platen proper, so as to serve as guides for the web A, from which the tickets are to be printed. The web just referred to is carried by a reel 34, that is mounted upon a standard 35, supported by the platen-frame strip 26$^a$, the web being carried from the reel downward and about a feeding-roller 36, that is rigidly mounted in an auxiliary frame 37, secured to the platen-frame strip 26. Beneath the rigidly-mounted feeding-roller 36 there is a yieldingly-mounted roller 38, any proper means being employed to hold the roller 38 in yielding contact with the roller 36; but in practice I prefer to support the journal-boxes of the roller by springs 39, the tension of such springs being regulated by adjusting-screws 40.

The main shaft of the machine, which is shown at 50, is mounted in bearings carried at one end by one of the standards 11 and at the other end by a standard 41. This shaft 50 carries two forwardly-extending crank-arms 42 and 42$^a$, which arms are connected with a cross-bar 43, that passes through and is rigidly connected to the longitudinal strips of the platen-frame, the connection being established by means of links 44 and 44$^a$. It will be noticed that the link 44, which would otherwise strike the shaft 50, is curved at the point marked $e$, this arrangement being desirable in order that when the platen-frame is thrown downward to move the platen into printing position the greatest and an exceedingly-powerful leverage will be obtained just at the time when the impression is being taken.

Figure 1:
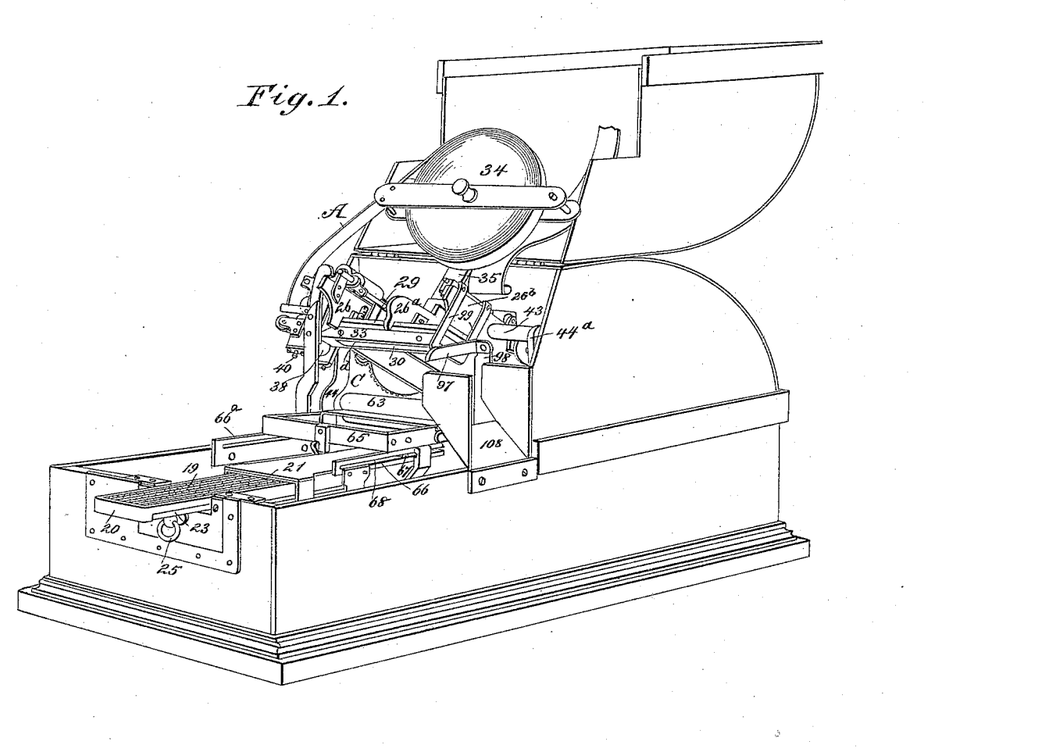
Figure 1 is a perspective view of the improved ticket-printing machine, a portion of the case-cover being thrown back to disclose the operating mechanism.
Figure 2:
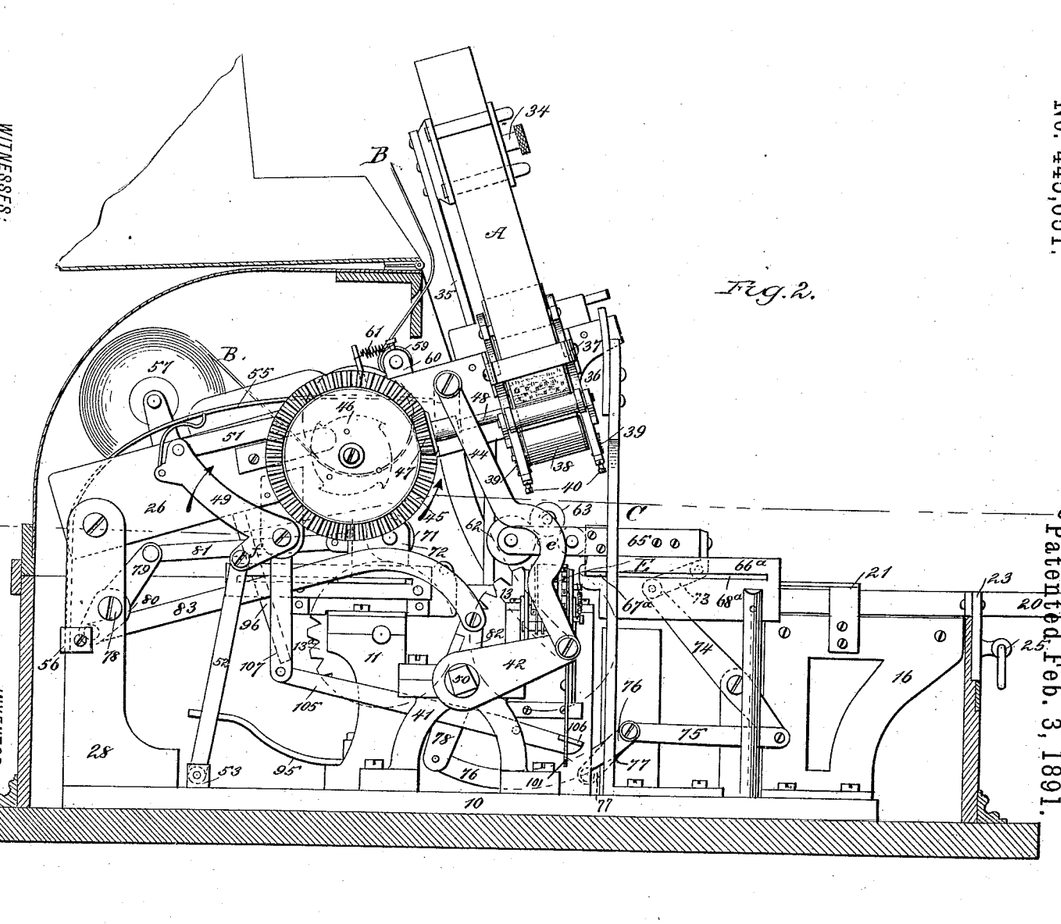
Fig. 2 is a side view of the machine, the crank arm or handle being removed and the case being shown in section, the parts being represented as they appear when in their normal position.
Figure 4:
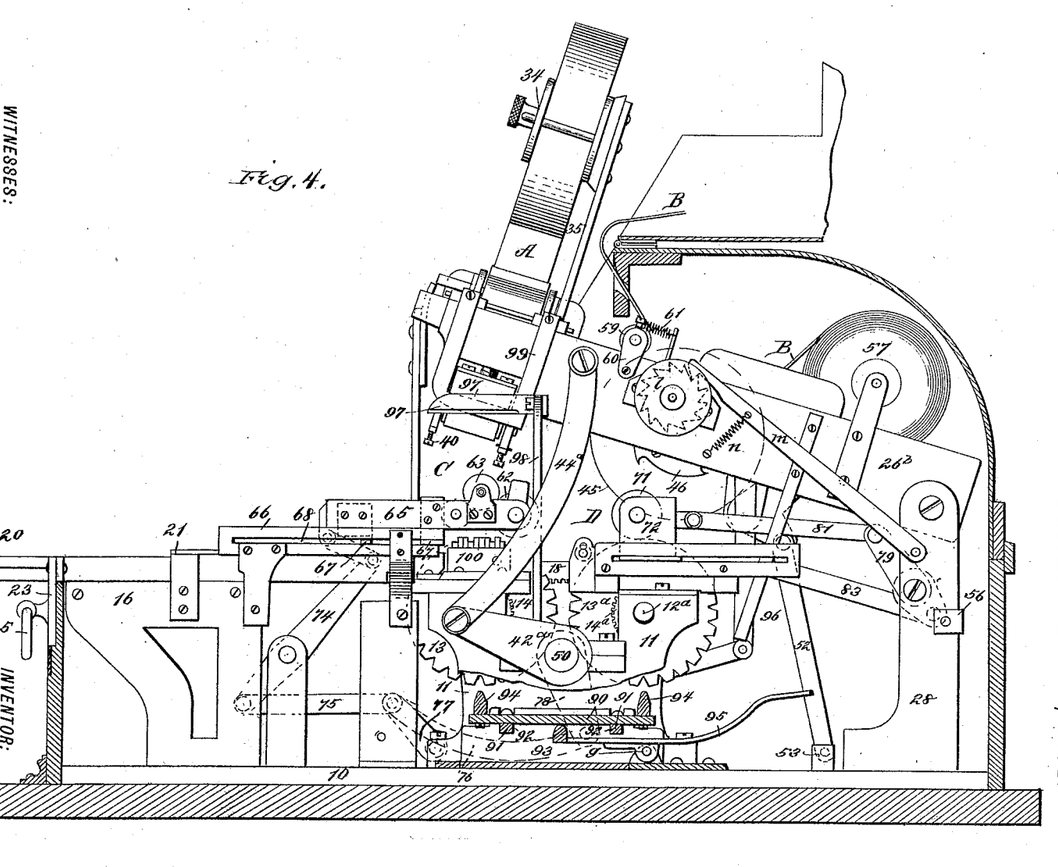
Fig. 4 is a view, partly sectional, of the opposite side of the machine, the parts being represented in their normal position—that is, with the platen-frame raised—and the case being shown in section.

The feeding of the web A is brought about by an attachment that is carried by the platen-frame strip 26, such attachment consisting of a flat-faced gear 45, that is studded to said strip and provided upon its inner face with a ratchet 46, the gear 45 being arranged to engage a pinion 47, that is carried by a shaft 48 of the feeding-roller 36. To the rear of the gear 45 I mount a bell-crank lever 49, and to this lever I connect a gravity-pawl 51, arranged to engage the ratchet 46. The short rearwardly-extending arm $f$ of the lever 49 I pivotally connect to a link 52, which link is in turn pivotally connected to a step 53, the arrangement being such that at every downward throw of the platen the lever 49 will be moved in the direction of the arrow shown in connection therewith in Fig. 2, and the pawl 51 will be carried forward, so as to engage one of the advance teeth of the ratchet 46. Then as the platen-frame is moved upward the lever 49 will move in a direction the reverse of that indicated by the arrow, and the pawl 51 will draw upon the ratchet, so that the gear 45 will be moved, as indicated by its arrow, and in so moving will, through the medium of the pinion 47, carry the feeding-roller 36 forward, so that the web will be drawn inward a distance equal to the length of one ticket. The movements of the platen above referred to are brought about through the medium of a crank-arm 54, which is connected to one end of the shaft 50, the platen-frame being normally upheld in the position in which it is shown in Figs. 1, 2, and 4 by a heavy leaf-spring 55, said spring being connected to a cross-bar 56 and arranged to extend upward over the shaft 27, and then forward and downward to engage the cross-bar 43.

This machine is organized not only to print a ticket, but also to print upon an auditing-strip at each throw of the platen. The web B, upon which the auditing impression is made, is drawn from a reel 57, passing thence to and over a combined feeding and impression roller 58, that is mounted between the platen-strips 26$^a$ and 26$^b$, the web being held in yielding contact with the peripheral face of the roller 58 by a roller 59, the journals of the said roller being mounted in bearings formed in pivotally-mounted arms 60. The springs 61 are provided to act to draw the roller 59 toward the roller 58. The shaft of the roller 59 carries a ratchet $l$, that is engaged by a pawl $m$, said pawl being pivotally connected to the adjacent standard 28, and held in contact with the ratchet by a spring $n$, the arrangement being such that at each downward movement of the platen-frame the roller 59 will be turned to carry the web B forward.

In connection with the disks 13 and 13ª I arrange inking mechanisms C and D, the inking mechanism C consisting of a series of distributing-rollers 62, 63, and 64, that are mounted in a carriage 65, said carriage being supported at one end by ways 66 and at the other end by ways 66ª, the main body of the carriage resting upon the upper edges of the ways, while all vertical displacement is prevented by laterally-extending lugs 67 and 67ª, that ride in slots 68 and 68ª, formed in the ways. The rollers of the mechanism C extend to the left from the disks 13 and over and slightly beyond a plate 70, from which the main body of the ticket is printed. The idea of having the rollers of the inking mechanism C extend beyond the plate 70 is to provide for the inking of a numbering attachment E, which attachment is similar to the one illustrated, described, and specifically claimed in an application filed concurrently herewith, Serial No. 327,575.

The inking mechanism D consists, essentially, of a roller 71, which is mounted in a carriage 72, such carriage being guided in any proper way.

Figure 3:
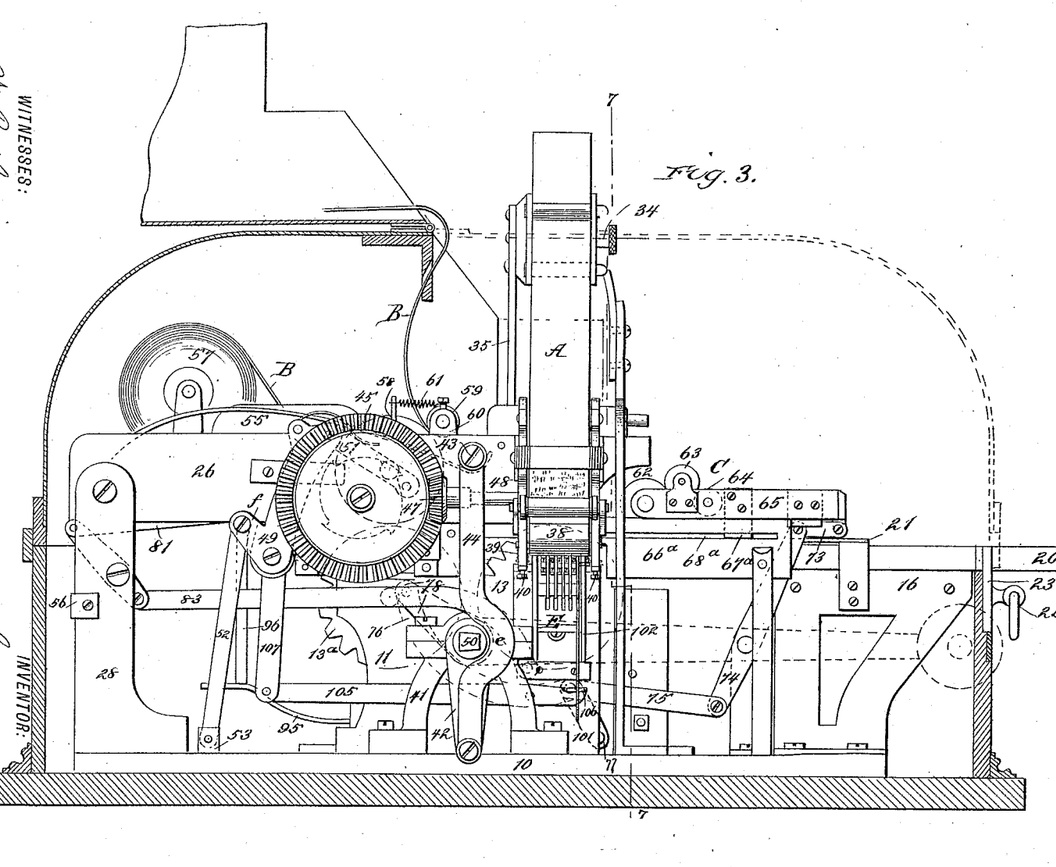
Fig. 3 is a similar view, the parts being represented as they appear when in a printing position.

To the carriage 65 I pivotally connect a link 73, which link is in turn pivotally connected to a lever 74, and the lever 74 I pivotally connect to a link 75, that is in turn pivotally connected to a curved link 76 and a pivotally-mounted support 77. The rear end of the link 76 I connect to an arm 78, that is rigidly secured to the shaft 50. When the parts are in their normal position, as represented in Fig. 2, the inking-roller 62 will be to the rear of the disks 13; but just as the operating-lever 54 is started forward to carry the platen-frame downward the carriage 65 will, through the medium of its mesne connections with the shaft 50, be started to the rear, and the roller 62 will be drawn over the face of the series of disks 13 and of the plate 70, the onward travel of the carriage being continued until the parts are in the position in which they are shown in Fig. 3.

To bring about a reciprocation of the carriage 72, I provide a rock-shaft 78, which carries crank-arms 79 and 80, the crank-arm 79 being connected with the carriage 72 by a link 81, while the crank-arm 80 is connected with an arm 82, mounted upon the shaft 50, by a link 83.

As before stated, the disks 13 are brought to and held in approximate register by means of springs 15, that are arranged as best shown in Fig. 5; but in order that a perfect register of the disks 13 and also of the disks 13ª may be obtained I provide a plate 90, which carries cross-bars 91, that ride in slots 92, formed in the vertical plates 93. To the upper face of the plate 90 I secure transverse wedge-shaped strips or bars 94, which, when the plate 90 is raised in a manner presently to be explained, will enter the spaces between the projections formed upon the disks 13 and 13ª and bearing against the inclined faces of said projections will act to bring all the disks of each series into accurate register. To bring about this raising of the plate 90, I provide a lever 95, which is pivotally mounted at g, (see Fig. 5,) one end of this lever being provided with a projection which bears against the underside of the plate 90, while the other end of the lever extends to the rear, there to be borne upon by a frame or arm 96, which extends downward from the platen-frame, the arrangement being such that when the rear end of the lever 95 is depressed the plate 90 will be raised and its wedge-shaped bars 94 will enter the spaces between the disk projections, moving the disks to the required position, this movement taking place when the platen-frame is thrown downward to take an impression.

At one side of the machine I mount a fixed knife-blade 97, such blade being supported by a standard 98, and to the platen-frame I hinge a frame 99, the lower cross-bar of which constitutes a knife-edge. Just outside of the disks 13 and upon the forward arm of the standard 11 I place a case 100, in which the type from which the date is printed are placed.

Although any proper connection for operating the numbering-disks might be provided, I prefer to employ a pawl 101, that is held to slide upon a plate 102, the pawl being held in engagement with the ratchet-teeth of the numeral-disk 103 by a spring 104. The lower end of the pawl 101 is slotted, as shown at i, and in the slot so formed there rides a lip 106, which extends outward from a lever 105, the lever being pivotally connected to any fixed portion of the frame and connected with the platen-frame by a link 107. Such in general is my improved universal ticket-printing machine.

Figure 10:
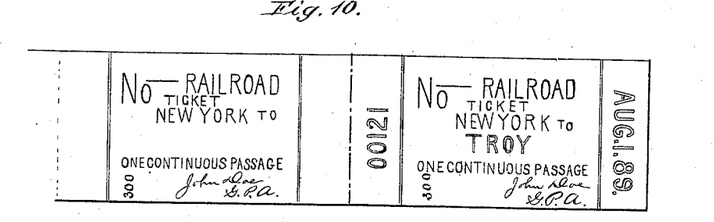
Fig. 10 is a view of a portion of the web from which the tickets are printed, the result of the first operation in printing being shown upon the left and the completed ticket being shown upon the right.
Figure 11:
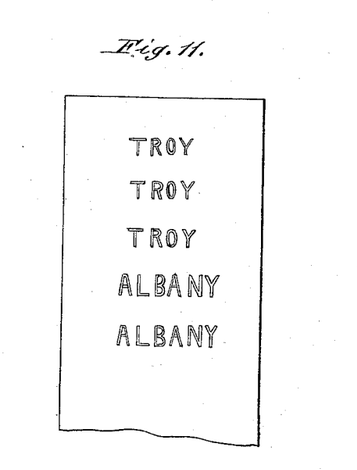
Fig. 11 is a view of a portion of the auditing-strip.

In operation the web A is led from its reel to and about the main feeding-roller, to pass thence beneath the platen, being upheld in its passage beneath the platen by the lips or flanges of the plates 33. The web having been led in, as above described, will, upon the downward throw of the lever 54, be carried forward across the face of the platen, and upon the initial throw of the lever 54 the main body of the ticket, as shown upon the left in Fig. 10, will be printed, and at this time the number of the ticket will also be printed. As the platen-frame is raised the web A will be fed forward, and at the next downward throw of the lever 54 the date and the name of the place to which the ticket is sold will be printed thereon, as shown upon the right in Fig. 10, the ticket in this case being supposed to have been sold to Troy. Upon the second upward throw of the lever 54 the fully-printed ticket will be severed from the web by the blade 97 and the cutting-edge of the swinging frame 99, and having been so severed will fall into a delivery-chute 108, passing thence into the hands of the operator. It will of course be understood that prior to the printing of the ticket the alphabetical slides 19 are adjusted so that the proper letters upon the disks 13 and 13ª will be brought into printing position. At the end of the day, or at any time when it is desired to ascertain the number of tickets sold from the home station, the end of the web B may be grasped and drawn forward, that portion of the web upon which the names appear being torn off. In this way I secure an accurate register of each and every ticket sold from the station at which the machine is located, and consequently I materially decrease the labor of the station-master and of the auditor, and at the same time I impose a check upon the station-master.

Although not at all essential to the proper working of my invention, I would under certain circumstances engrave the outer face of the feeding-roller 36, and in connection with this roller I would arrange an inking attachment 110, any proper inking attachment being employed for this purpose, and the parts being arranged so that, if desired, the inking attachment may be thrown up out of contact with the feeding-roller. By means of this attachment 110 I provide for the printing of a pattern upon the back of the web upon which the tickets are to be printed.

Having thus fully described my invention, I claim as new and desire to secure by Letters Patent—

1. In a ticket-printing machine, the combination, with a series of alphabetical disks carrying gears, of racks engaging said gears, alphabetical slides connected with said racks, and a sliding frame supporting said slides and engaging all of the slides in its inward movements, substantially as described.

2. In a ticket-printing machine, the combination, with a series of alphabetical disks carrying gears, of racks engaging said gears, alphabetical slides connected with said racks and forming shoulders at their inner ends, and a sliding frame having a cross-bar that engages the shoulders of all of said slides in its outward movement, substantially as described.

3. In a ticket-printing machine, the combination, with a series of alphabetical disks carrying gears, of racks engaging said gears, slides connected with said racks, a sliding frame supporting said slides and engaging all of the slides in its inward movements, and a transverse slide that engages all of said slides in its outward movement, substantially as described.

4. In a ticket-printing machine, the combination, with two sets or series of alphabetical disks, of gears carried thereby, racks arranged to engage the gears, and a disk-registering attachment which is common to the two sets or series of disks, substantially as shown and described.

5. In a ticket-printing machine, the combination, with two sets or series of alphabetical disks, of a means for revolving the corresponding disks of each set or series of disks in unison and a disk-registering mechanism that is common to the two sets or series of disks, substantially as described.

6. In a ticket-printing machine, the combination, with two sets of revolving disks, of a pivoted frame carrying a platen and a separate set of web-feeding rolls for each set of disks, said web-feeding rolls being carried by the platen, substantially as described.

7. In a ticket-printing machine, the combination, with two sets or series of alphabetical disks, of a pivoted platen-frame carrying a platen that acts in conjunction with one set of disks, a set of web-feeding rolls also carried by said frame and arranged in connection with said platen, and a second set of web-feeding rolls carried by the platen-frame and arranged in connection with the second set of disks, one of said second set of feed-rollers forming an impression-roll, substantially as described.

8. The combination, in a ticket-printing machine, of two sets or series of disks and a body-printing plate, a pivoted frame carrying a platen, and a web feeding mechanism common to both the body-plate and one set of disks, and an impression-roll, and a web-feeding roll also carried by the said frame and arranged in connection with the other set of disks, substantially as described.

9. The combination, in a ticket-printing machine, of two sets or series of disks, a pivoted frame carrying a platen in line with one set of disks and carrying an impression-roller in line with the other set of disks, a separate set of inking-rollers for said disks, reciprocating carriages for said inking-rollers, moving in guideways, an operating-shaft, and lever connections between the shaft and said carriages and between the shaft and platen, substantially as described.

10. In a ticket-printing machine, the combination of two sets or series of disks and a set of web-feeding rolls for each of said series of disks, one of the rolls of one set being geared to one of the rolls of the other set, substantially as described.

GIDEON B. MASSEY.

Witnesses:
EDWARD KENT, Jr.,
C. SEDGWICK.